US012657898B2

(12) United States Patent
Yun et al.

(10) Patent No.: US 12,657,898 B2
(45) Date of Patent: Jun. 16, 2026

(54) OBJECT RECOGNITION DEVICES, ELECTRONIC DEVICES AND METHODS OF RECOGNIZING OBJECTS

(71) Applicant: Samsung Electronics Co., Ltd., Suwon-si (KR)

(72) Inventors: Eun-Jin Yun, Seoul (KR); Sung-Joon Kim, Hwaseong-si (KR); Sang-Hoan Chang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 518 days.

(21) Appl. No.: 18/171,579

(22) Filed: Feb. 20, 2023

(65) Prior Publication Data

US 2023/0196753 A1 Jun. 22, 2023

Related U.S. Application Data

(63) Continuation of application No. 16/268,762, filed on Feb. 6, 2019, now Pat. No. 11,586,848.

(30) Foreign Application Priority Data

Jul. 24, 2018 (KR) ........................ 10-2018-0085699

(51) Int. Cl.
*G06V 10/82* (2022.01)
*G06F 18/21* (2023.01)
(Continued)

(52) U.S. Cl.
CPC ............ *G06V 10/82* (2022.01); *G06F 18/214* (2023.01); *G06F 18/217* (2023.01); *G06V 20/00* (2022.01);
(Continued)

(58) Field of Classification Search
None
See application file for complete search history.

(56) References Cited

U.S. PATENT DOCUMENTS 7,356,755 B2    4/2008    Fackenthal
8,112,693 B2    2/2012    Kong et al.
(Continued)

FOREIGN PATENT DOCUMENTS

CN        1578968 A      2/2005
CN      105900116 A      8/2016
(Continued)

OTHER PUBLICATIONS

Korean Office Action dated Aug. 8, 2023 issued in corresponding Korean Patent Application No. 10-2018-0085699.
(Continued)

*Primary Examiner* — Vikkram Bali
(74) *Attorney, Agent, or Firm* — Fish & Richardson P.C.

(57) ABSTRACT

An object recognition device including an artificial neural network (NN) engine configured to receive learning data and weights, make an object recognition model (ORM) learn by using the received information, and provide selected weight data including weights from the selected portion of the weights, and further configured to receive a feature vector, and apply the feature vector extracted from an object data that constructs the object and the selected weight data to the learned ORM to provide an object recognition result, a nonvolatile memory (NVM) configured to store the learned ORM, and an error correction code (ECC) engine configured to perform an ECC encoding on the selected weight data to generate parity data, provide the selected weight data and the parity data to the NVM, and provide the selected weight data to the NN engine by performing an ECC decoding on the selected weight data based on the parity data.

13 Claims, 13 Drawing Sheets

(51) Int. Cl.

| | |
|---|---|
| *G06F 18/214* | (2023.01) |
| *G06V 20/00* | (2022.01) |
| *G06V 30/19* | (2022.01) |
| *G06V 30/226* | (2022.01) |

(52) U.S. Cl.
  CPC .... *G06V 30/19173* (2022.01); *G06V 30/2272* (2022.01)

(56) References Cited

U.S. PATENT DOCUMENTS

| | | | |
|---|---|---|---|
| 8,898,549 B2 | 11/2014 | Hubris et al. | |
| 8,934,301 B2 | 1/2015 | Yun | |
| 9,153,231 B1 | 10/2015 | Salvador et al. | |
| 9,235,466 B2 | 1/2016 | Sohn et al. | |
| 9,940,539 B2 | 4/2018 | Han et al. | |
| 10,417,525 B2 * | 9/2019 | Ji ...................... | G06F 18/24137 |
| 2003/0055796 A1 | 3/2003 | Shetty et al. | |
| 2008/0046778 A1 | 2/2008 | Yoshida | |
| 2013/0191705 A1 | 7/2013 | Watanabe et al. | |
| 2016/0335536 A1 | 11/2016 | Yamazaki et al. | |
| 2017/0148430 A1 | 5/2017 | Lee | |
| 2018/0152206 A1 | 5/2018 | Sin et al. | |
| 2018/0165364 A1 * | 6/2018 | Mehta ...................... | G06F 9/54 |
| 2019/0004984 A1 | 1/2019 | Lee et al. | |
| 2019/0028574 A1 | 1/2019 | Sun | |
| 2020/0320184 A1 | 10/2020 | Nikitidis et al. | |
| 2021/0027195 A1 * | 1/2021 | Alakuijala ............ | G06N 3/096 |

FOREIGN PATENT DOCUMENTS

| | | |
|---|---|---|
| CN | 106503654 A | 3/2017 |
| CN | 108121617 A | 6/2018 |
| JP | 20100092574 A | 4/2010 |
| KR | 10-2017-0061016 A | 6/2017 |
| KR | 10-2018-0061870 A | 6/2018 |

OTHER PUBLICATIONS

Chinese Office Action dated Jan. 31, 2024 issued in Chinese Patent Application No. 201910280429.3.

* cited by examiner

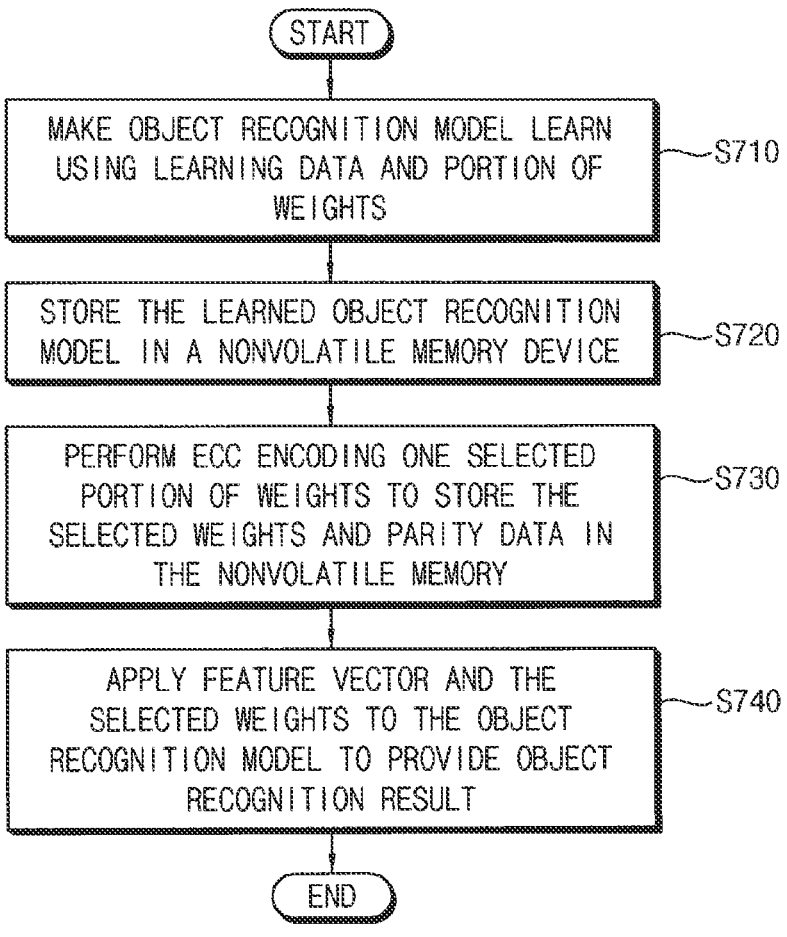

START

MAKE OBJECT RECOGNITION MODEL LEARN USING LEARNING DATA AND PORTION OF WEIGHTS ⟋S710

STORE THE LEARNED OBJECT RECOGNITION MODEL IN A NONVOLATILE MEMORY DEVICE ⟋S720

PERFORM ECC ENCODING ONE SELECTED PORTION OF WEIGHTS TO STORE THE SELECTED WEIGHTS AND PARITY DATA IN THE NONVOLATILE MEMORY ⟋S730

APPLY FEATURE VECTOR AND THE SELECTED WEIGHTS TO THE OBJECT RECOGNITION MODEL TO PROVIDE OBJECT RECOGNITION RESULT ⟋S740

END

OBJECT RECOGNITION DEVICES, ELECTRONIC DEVICES AND METHODS OF RECOGNIZING OBJECTS

CROSS-REFERENCE TO RELATED APPLICATION

This is a continuation of U.S. application Ser. No. 16/268,762 filed Feb. 6, 2019, which claims priority to Korean Patent Application No. 10-2018-0085699, filed on Jul. 24, 2018, the disclosures of each of which are hereby incorporated by reference in their entirety.

BACKGROUND

1. Technical Field

Example embodiments relate to artificial intelligence, and more particularly to object recognition devices, electronic devices for recognizing object, and/or methods of recognizing object.

2. Discussion of the Related Art

With development of information devices such as a computer and a smartphone, digital computer application and digital signal processing technologies have been developed.

For example, recent technologies such as artificial intelligence (AI) image recognition (video/motion recognition), deep learning (deep learning), and machine learning have been developed, and intelligent services that automatically recognize data information (e.g., voice, image, video, or text), and provide information related to such data or provide services relating to the data are being used in various fields.

Recently, such AI-based intelligent services are being employed in many cutting edge devices.

SUMMARY

Some example embodiments provide object recognition devices capable of processing artificial intelligent data more efficiently.

Some example embodiments provide electronic devices each including an object recognition device, which is capable of processing artificial intelligent data more efficiently.

Some example embodiments provide methods of recognizing an object in an object recognition device, which can process artificial intelligent data more efficiently.

According to an example embodiment, an object recognition device includes an artificial neural network engine configured to receive learning data and weights, make an object recognition model learn by using the learning data and a selected portion of the weights, and provide selected weight data, the selected weight data based on the selected portion of the weights, the artificial neural network engine further configured to receive a feature vector, and apply the feature vector and the selected weight data to the learned object recognition model to provide a recognition result of an object, the feature vector extracted from object data constructing the object, a nonvolatile memory device configured to store the learned object recognition model therein, and an error correction code (ECC) engine configured to perform an ECC encoding on the selected weight data to generate parity data, provide the selected weight data and the parity data to the nonvolatile memory device, and provide the selected weight data to the artificial neural network engine by performing an ECC decoding on the selected weight data based on the parity data.

According to an example embodiment, an electronic device includes a processor configured to provide a learning data, weights and a feature vector, the feature vector being extracted from object data constructing an object, and an object recognition device configured to make an object recognition model learn by using the learning data and a portion of the weights, and apply the feature vector to the object recognition model to provide a recognition result of the object. The object recognition device may include a nonvolatile memory device configured to store the learned object recognition model therein, and an error correction code (ECC) engine configured to perform an ECC encoding on selected weight data, the selected weight data including a selected portion of the weights, to generate parity data, and provide the selected weight data and the parity data to the nonvolatile memory device.

According to an example embodiment, a method of recognizing an object in an object recognition device, which includes an artificial neural network engine, a nonvolatile memory device, and an error correction code (ECC) engine connected between the artificial neural network engine and the nonvolatile memory device, includes receiving, by the artificial neural network engine, learning data and weights to make an object recognition model learn by using the learning data and a selected portion of the weights, storing the learned object recognition model in the nonvolatile memory device, performing, by the ECC engine, an ECC encoding on selected weight data, the selected weight data including weights from the selected portion of the weights to generate parity data, and providing the selected weight data and the parity data to the nonvolatile memory device, and receiving, by the artificial neural network engine, a feature vector extracted from object data constructing the object; applying the feature vector and the selected weight data to the learned object recognition model to provide a recognition result of the object. The feature vector may be extracted from an object data constructing the object.

Accordingly, in an object recognition device, an ECC engine may perform an ECC encoding and an ECC decoding on selected portion of weights instead of all of the weights according to a result of learning. Thus, an artificial neural network engine may process the AI data more efficiently.

BRIEF DESCRIPTION OF THE DRAWINGS

Illustrative, non-limiting example embodiments will be more clearly understood from the following detailed description in conjunction with the accompanying drawings.

FIG. 2 is a block diagram illustrating the object recognition model in FIG. 1 according to an example embodiment.

FIG. 17 is a flow chart illustrating a method of recognizing an object in an object recognition device according to an example embodiment.

DETAILED DESCRIPTION

Some example embodiments will be described more fully hereinafter with reference to the accompanying drawings.

An artificial intelligence system is a computer system that implements human-level intelligence, and unlike the existing rule-based smart systems, a machine learns, judges, and becomes smarter. The more the artificial intelligence systems are used, the recognition capabilities of the system are further improved and user preferences are more accurately identified and thus, existing rule-based smart systems are increasingly being replaced by deep-learning-based artificial intelligence systems.

Artificial intelligence technology may include a machine learning (e.g., a deep learning) algorithm and an element technology utilizing machine learning.

A machine learning algorithm refers to an algorithm that classifies/learns characteristics of input data by itself. An element technology refers to a technology that simulates functions such as recognition and judgment of the human brain using a machine learning algorithm (e.g., a deep learning algorithm). The element technology includes linguistic understanding, visual understanding, reasoning/prediction, knowledge representation, and motion control.

Various fields in which artificial intelligence technology is applied are as follows. Linguistic understanding refers to a technology field for recognizing, applying, and processing human language/characters, including natural language processing, machine translation, dialogue system, question and answer, speech recognition/synthesis, and the like.

Visual understanding refers to a technology field for recognizing and processing objects as human vision, including object recognition, object tracking, image search, human recognition, scene understanding, spatial understanding, and image enhancement. Reasoning and prediction refers to a technology field for judging information, and logically inferring and predicting information, including knowledge/probability based reasoning, optimization prediction, preference-based planning, and recommendation. Knowledge representation refers to a technology field for automating human experience information into knowledge data, including knowledge building (data generation/classification) and knowledge management (data utilization). The motion control refers to a technology field for controlling the autonomous travel of a vehicle and the motion of a robot, and includes motion control (e.g., navigation, collision, and/or traveling), operation control (e.g., behavior control).

Figure 1:
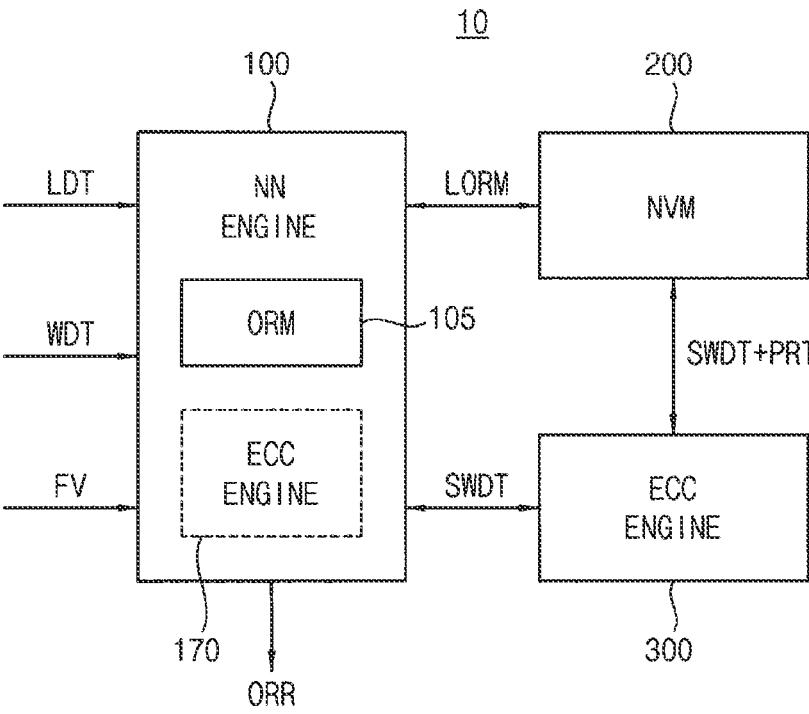
FIG. 1 is a block diagram illustrating an object recognition device according to an example embodiment.

FIG. 1 is a block diagram illustrating an object recognition device according to an example embodiment.

At least some portion of an object recognition device 10 may be implemented as a hardware or a combination of hardware and software, and may be provided in various electronic devices. For example, the object recognition device 10 may be fabricated in the form of a hardware chip exclusive for artificial intelligence (AI), or a conventional general purpose processor (e.g., a CPU or an application processor) or a graphics-only processor (e.g., a GPU), each programmed to become a special purpose processor and mounted on the various electronic devices. At this time, the hardware chip exclusive for artificial intelligence is a dedicated processor for probability calculation, and has higher parallel processing performance than a conventional general processor, thus enabling rapid computing works in the machine learning and artificial intelligence field.

When the object recognition device 10 is implemented as software (or a program including an instruction), the software may be stored in a computer-readable non-transitory computer-readable storage media. Further, in this case, at least one software item may be an operating system (OS) or by a desired (or alternatively, predetermined) application. In some example embodiments, some of the software may be provided by an operating system (OS), and some of the software modules may be provided by a desired (or alternatively, predetermined) application.

Referring to FIG. 1, the object recognition device 10 includes an artificial neural network engine 100, an error correction code (ECC) engine 300 and a nonvolatile memory device 200.

The artificial neural network engine 100 may receive learning data LDT and weights WDT from an outside, make an object recognition model (ORM) 105 learn by using the learning data LDT and a selected portion of the weights WDT, and provide selected weight data, which includes weights included in the selected portion of the weights WDT, to the nonvolatile memory device 200. The nonvolatile memory device 200 may store the selected weight data SWDT therein. The selected weight data SWDT are selected weights of the weights WDT and the selected weights each may satisfy a criteria.

The ECC engine 300 may perform an ECC encoding on the selected weight data SWDT to generate parity data PRT and to provide the selected weight data SWDT and the parity data PRT to the nonvolatile memory device 200. The non-volatile memory device 200 may store the selected weight data SWDT and the parity data PRT in a memory cell array therein.

The ECC engine 300 may receive the selected weight data SWDT and the parity data PRT from the nonvolatile memory device 200, perform an ECC decoding on the selected weight data SWDT based on the parity data PRT, and provide the artificial neural network engine 100 with the selected weight data SWDT or error-corrected selected weight data.

Although not illustrated, the artificial neural network engine 100 may provide the weights WDT to the ECC engine 300, and the ECC engine 300 may select a portion of the weights WDT according to learning results or additional information provided from the artificial neural network engine 100, and perform the ECC encoding on the selected weights to generate parity data. That is, the ECC engine 300 may perform a pruning operation on the weights WDT to decrease a number of bits to be ECC encoded. The additional information may be a value of selecting some weights of the weights WDT.

When the artificial neural network engine 100 includes an ECC engine 170 and the nonvolatile memory device 200 provides the weights WDT, the nonvolatile memory device 200 may output the weights WDT by a desired (or alternatively, predetermined) size of unit and the nonvolatile memory device 200 and provide the weights WDT to the ECC engine 300 by arranging the weights WDT in, for example, decreasing order of values of the weights WDT per unit. The ECC engine 300 may perform the ECC encoding on upper bits of each unit of the arranged weights WDT to generate the parity data, and may provide the ECC engine 170 in the artificial neural network engine 100 with weights of the upper bits and the parity data associated with the upper bits.

The nonvolatile memory device 200 may store a learned object recognition model LORM provided from the artificial neural network engine 100, and provide the learned object recognition model LORM to the artificial neural network engine 100.

The nonvolatile memory device 200 may store the learning data LDT and the weights WDT, and may provide the learning data LDT and the weights WDT to the artificial neural network engine 100 without passing through the ECC engine 300.

The artificial neural network engine 100 may receive a feature vector FV extracted from an object data constructing an object, and apply the feature vector FV and the selected weight data SWDT to the learned object recognition model LORM to provide a recognition result of an object ORR. The object may include, for example, an image data (e.g., still image data or a moving image data) and a voice data.

The artificial neural network engine 100 may select portions of weights from the weights WDT, apply each of the portions of weights and the learning data LDT to the object recognition model 105, evaluate a similarity between a result of applying each of the portions of weights and the learning data LDT to the object recognition model 105 and an expected value of the learning data LDT. A selected portion of weights may be stored in the nonvolatile memory device 200 as the selected weight data SWDT when a similarity between a result of applying the selected portion of weights and the learning data LDT to the object recognition model 105 and the expected value of the learning data LDT is equal to or greater than a first reference value. The sub portion of weights may be referred to as a selected portion of weights.

For example, the artificial neural network engine 100 may select a first portion of weights from the weights WDT, and apply the first portion of weights and the object recognition model 105. The artificial neural network engine 100 may evaluate a first similarity between a result of applying the first portion of weights and the learning data LDT to the object recognition model 105. When the first similarity is equal to or greater than the first reference value, the artificial neural network engine 100 may provide the first portion of weights to the nonvolatile memory device 200 as the selected weight data SWDT.

When the first similarity is smaller than the first reference value, the artificial neural network engine 100 may select a second portion of weights from the weights WDT by increasing a number of bits included in the first portion of weights, and apply the second portion of weights and the object recognition model 105. The artificial neural network engine 100 may evaluate a second similarity between a result of applying the first portion of weights and the learning data LDT to the object recognition model 105.

In an example embodiment, the artificial neural network engine 100 may include the ECC engine 170, and the ECC engine 170 may perform the ECC encoding/ECC decoding on at least one of the weights WDT and the feature vector FV.

The object recognition model 105 may include, for example, a neural network model or a deep learning model which performs computing based on connection relationships among a plurality of network nodes and the selected weights included in the selected weight data SWDT and corresponding to a portion of the plurality of network nodes.

The object recognition model 105 may be designed to simulate the human brain structure on a computer. The object recognition model 105 may include a plurality of network nodes having weights (weighted values) that simulate a neuron of a human neural network. The plurality of network nodes may respectively establish connection relationships so that the neurons simulate synaptic activity of sending and receiving signals via synapses.

The object recognition model 105 may, for example, include a neural network model or a deep learning model developed from a neural network model. In the deep learning model, a plurality of network nodes are located at different depths (or layers), and data can be exchanged according to a convolution connection relationship. Models such as deep neural network (DNN), recurrent neural network (RNN), or bidirectional recurrent deep neural network (BRDNN) may be used as in a deep learning model. However, deep learning models according to example embodiments are not limited to the above examples.

Figure 2:
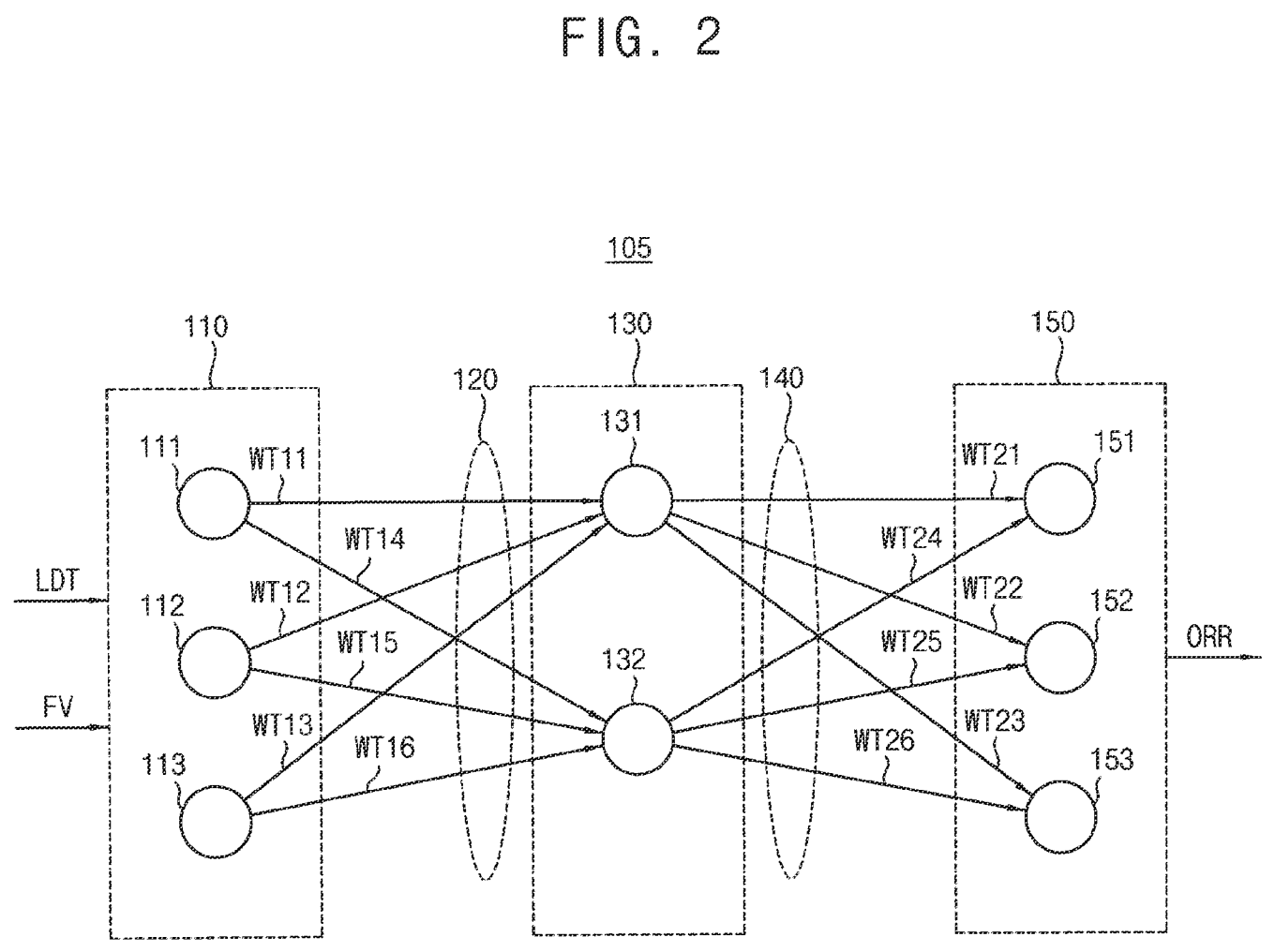

FIG. 2 is a block diagram illustrating the object recognition model in FIG. 1 according to an example embodiment.

Referring to FIG. 2, the object recognition model 105 may include an input layer 110, an hidden layer 130, an output layer 150, first connection lines 120, and second connection lines 140.

The input layer 110 may include input nodes 111, 112 and 113, the hidden layer 130 may include hidden nodes 131 and 132, and the output layer 150 may include output nodes 151, 152 and 153.

The input nodes 111, 112 and 113 in the input layer 110 may receive at least one of the learning data LDT or the feature vector FV, and transfer the learning data LDT or the feature vector FV to the hidden layer 130 through the first connection lines 120 having first weights WT11~WT16.

The hidden nodes 131 and 132 in the hidden layer 120 may receive the at least one of the learning data LDT or the feature vector FV, perform computing on learning data LDT or the feature vector FV, and transfer a result of the computing to the output layer 150 through the second connection lines 140 having second weights WT21~WT26.

The output nodes 151, 152 and 153 in the input layer 150 may receive values from the hidden layer 130, perform computing on the values, and output a result of the computing as the recognition result of the object ORR corresponding to the at least one of the learning data LDT or the feature vector FV.

The first weights WT11~WT16 and the second weights WT21~WT26 may be referred to as connection weights or connection strengths.

The artificial neural network engine 100 may select weights whose values are equal to or greater than a second reference value, and may provide the select weights as the selected weight data SWDT.

Although not illustrated, the object recognition model 105 may include a plurality of hidden layers. A neural network including a plurality of hidden layers may be referred to as a deep neural network. Training the deep neural network may be referred to as deep learning.

Assuming that the plurality of hidden layers includes a first hidden layer, a second hidden layer, and a third hidden layer, an output of a hidden node included in the first hidden layer may be connected to hidden nodes belonging to the second hidden layer. An output of a hidden node belonging to the second hidden layer may be connected to hidden nodes belonging to the third hidden layer.

For example, the object recognition model 105 may input outputs of previous hidden nodes included in a previous hidden layer into each hidden layer through edges having connection weights, and may generate outputs of hidden nodes included in a hidden layer based on values obtained by applying the connection weights to the outputs of the previous hidden nodes and activation functions.

To connect or generate and transmit a signal output to a next hidden node, a result of the activation functions needs to exceed a threshold of a current hidden node. In this example, a node maintains a deactivated state without firing (or sending) a signal to a next node until a desired (or alternatively, predetermined) threshold strength of activation is reached through input vectors.

In an example embodiment, the object recognition model 105 may train the recognition model 105 through supervised learning. The supervised learning refers to a method of inputting learning data and an output data corresponding to the learning data into the artificial neural network engine 100 and updating the weights so that the learning data and the output data corresponding to the learning data may be output.

Figure 3:
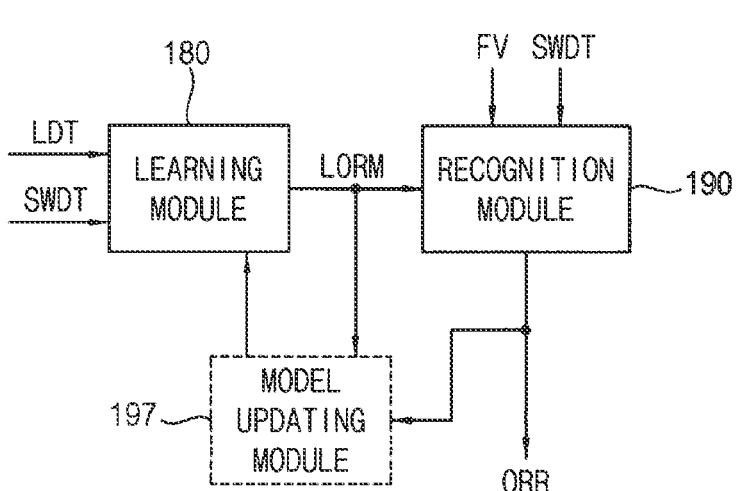
FIG. 3 is a block diagram illustrating an example of the artificial neural network engine in FIG. 1 according to an example embodiment.

FIG. 3 is a block diagram illustrating an example of the artificial neural network engine in FIG. 1 according to an example embodiment.

Referring to FIG. 3, the artificial neural network engine 100 may include a learning module 180 and a recognition module 190. The artificial neural network engine 100 may further include a model updating module 197. These modules may refer to specific functions of the artificial neural network engine, and thus may not necessarily be separate structures from each other.

The learning module 180 may make the object recognition model ORM learn by using the learning data LDT and the selected weights SWDT. The recognition module 190 may apply the feature vector FV and the selected weights to the learned object recognition model LORM to provide the recognition result of the object ORR.

The model updating module 197 may determine whether to update the object recognition model ORM and may update the object recognition model ORM based on a result of the determination. The model updating module 197 may update the object recognition model ORM when a similarity between the recognition result of the object ORR and the object is less than a third reference value.

Figure 4:
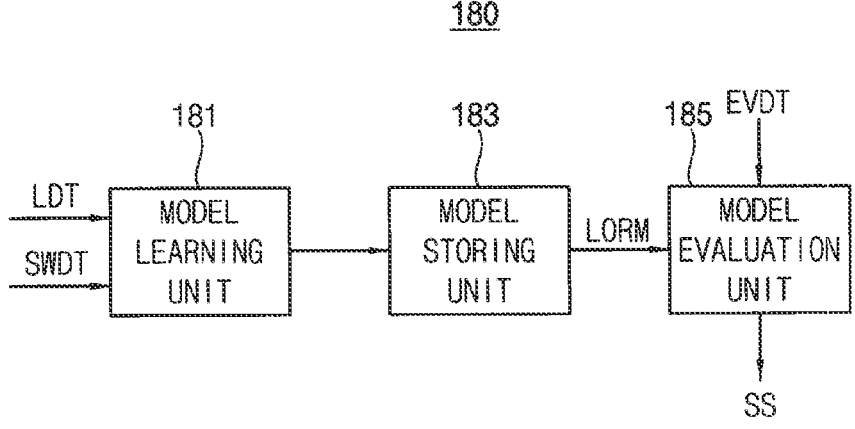
FIG. 4 is a block diagram illustrating an example of the learning module in FIG. 3 according to an example embodiment.

FIG. 4 is a block diagram illustrating an example of the learning module in FIG. 3 according to an example embodiment.

Referring to FIG. 3, the learning module 180 may include a model learning unit 181, a model storing unit 183 and a model evaluation unit 185. The various units may refer to specific functions of the learning module, and thus may not necessarily be physically separate from each other The model learning unit 181 may make the object recognition model ORM learn by using the learning data LDT and the selected weights SWDT. The model storing unit 183 may store the learned object recognition model LORM. The model evaluation unit 185 evaluate the learned object recognition model LORM based on evaluation data EVDT. The model evaluation unit 185 may receive the evaluation data EVDT, and apply the evaluation data EVDT to the learned object recognition model LORM, and make the model learning unit 181 learn the object recognition model ORM when a similarity signal SS output from the model evaluation unit 185 does not satisfy a first criteria.

When there are a plurality of pre-constructed object recognition models, the model learning unit 181 may determine an object recognition model, in which relevance between the input learned data and the basic learning data is high, as an object recognition model ORM to be learned. In this case, the basic learning data can be pre-classified by types of data, and the object recognition model can be pre-constructed by types of data.

According to various exemplary embodiments, the model learning unit 181 may learn the object recognition model ORM using learning algorithm including, for example, error back-propagation or gradient descent.

Figure 5:
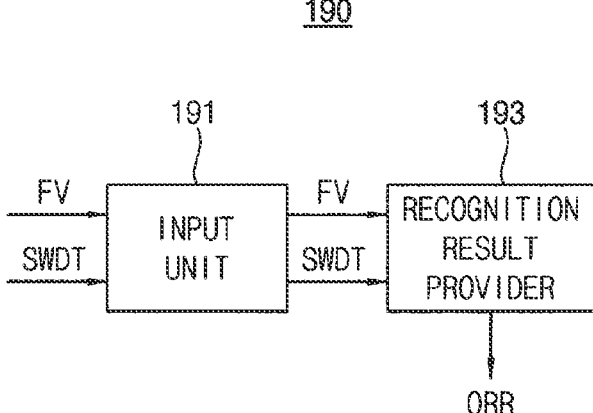
FIG. 5 is a block diagram illustrating an example of the recognition module in FIG. 3 according to an example embodiment.

FIG. 5 is a block diagram illustrating an example of the recognition module in FIG. 3 according to an example embodiment.

Referring to FIG. 5, the recognition module 190 may include an input unit 191 and a recognition result provider 193.

The input unit 191 may receive the feature vector FV and the selected weights SWDT and provide the feature vector FV and the selected weights SWDT to the recognition result provider 193. The recognition result provider 193 may apply the feature vector FV and the selected weights SWDT to the learned object recognition model LORM to provide the recognition result of the object ORR.

Figure 6:
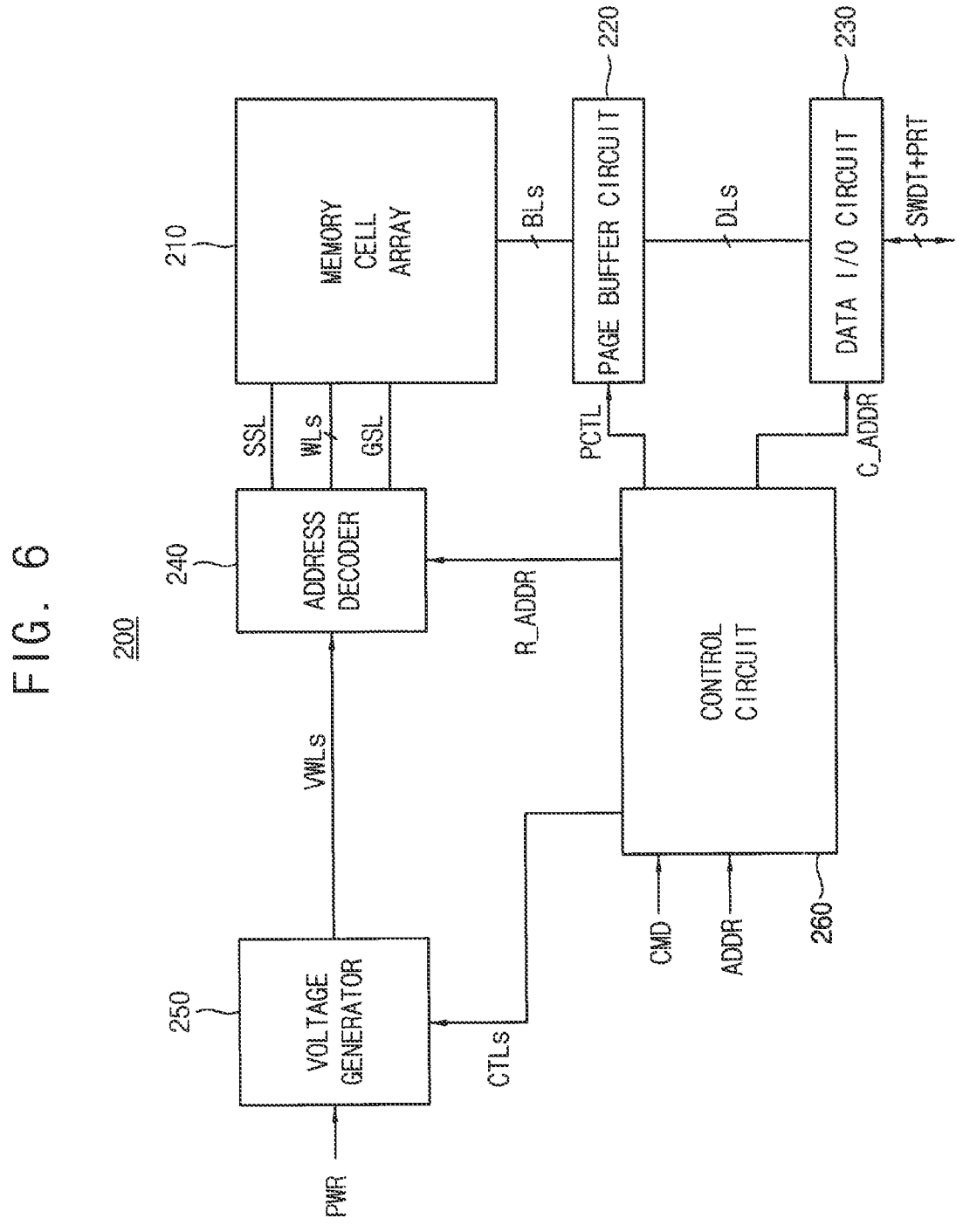
FIG. 6 is a block diagram illustrating the nonvolatile memory device in FIG. 1 according to an example embodiment.

FIG. 6 is a block diagram illustrating the nonvolatile memory device in FIG. 1 according to an example embodiment.

Referring to FIG. 6, the nonvolatile memory device 200 includes a memory cell array 210, an address decoder 240 a page buffer circuit 220, a data input/output circuit 230, a control circuit 260, and a voltage generator 250.

The memory cell array 210 may be coupled to the address decoder 240 through a string selection line SSL, a plurality of word-lines WLs, and a ground selection line GSL. In addition, the memory cell array 210 may be coupled to the page buffer circuit 220 through a plurality of bit-lines BLs. The memory cell array 210 may include a plurality of nonvolatile memory cells coupled to the plurality of word-lines WLs and the plurality of bit-lines BLs. The plurality of nonvolatile memory cells may be arranged in the memory cell array 210.

In some example embodiments, the memory cell array 210 may be a three-dimensional memory cell array, which is formed on a substrate in a three-dimensional structure (or a vertical structure). In this case, the memory cell array 210 may include vertical cell strings stacked in vertical direction so that at least one memory cell is located over another memory cell.

In other example embodiments, the memory cell array 210 may be a two-dimensional memory cell array, which is formed on a substrate in a two-dimensional structure (or a horizontal structure).

Figure 7:
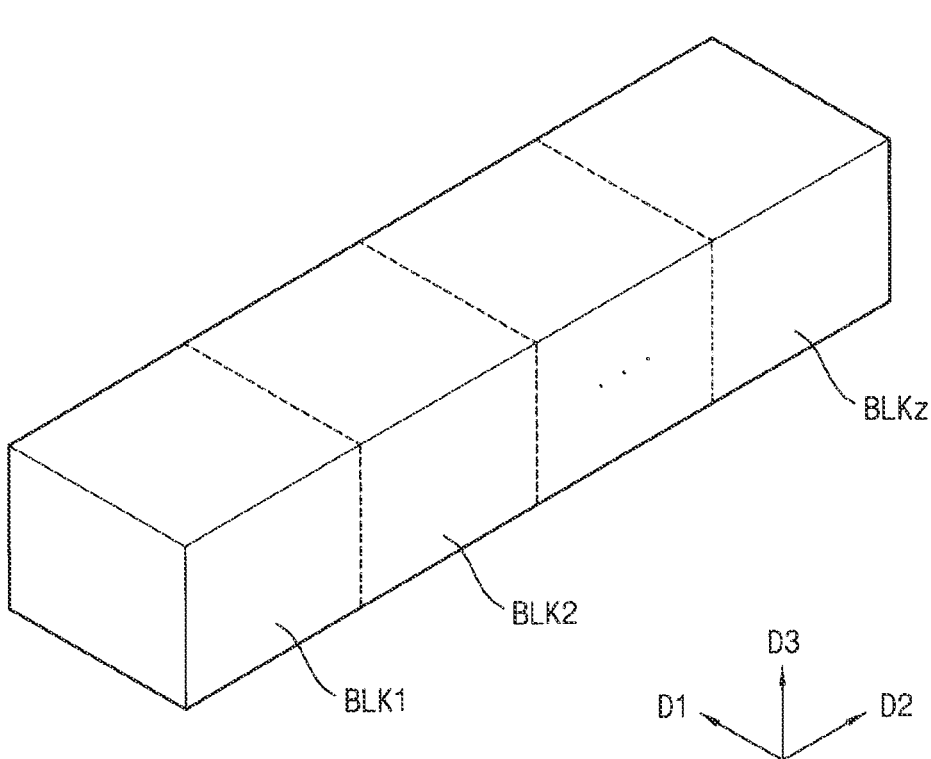
FIG. 7 is a block diagram illustrating the memory cell array in FIG. 6, according to an example embodiment.

FIG. 7 is a block diagram illustrating the memory cell array in FIG. 6, according to an example embodiment.

Referring to FIG. 7, the memory cell array 210 may include a plurality of memory blocks BLK1 to BLKz extending in first through third directions D1, D2 and D3. In an embodiment, the memory blocks BLK1 to BLKz are selected by the address decoder 240 in FIG. 6. For example, the address decoder 240 may select a memory block BLK corresponding to a block address among the memory blocks BLK1 to BLKz.

Figure 8:
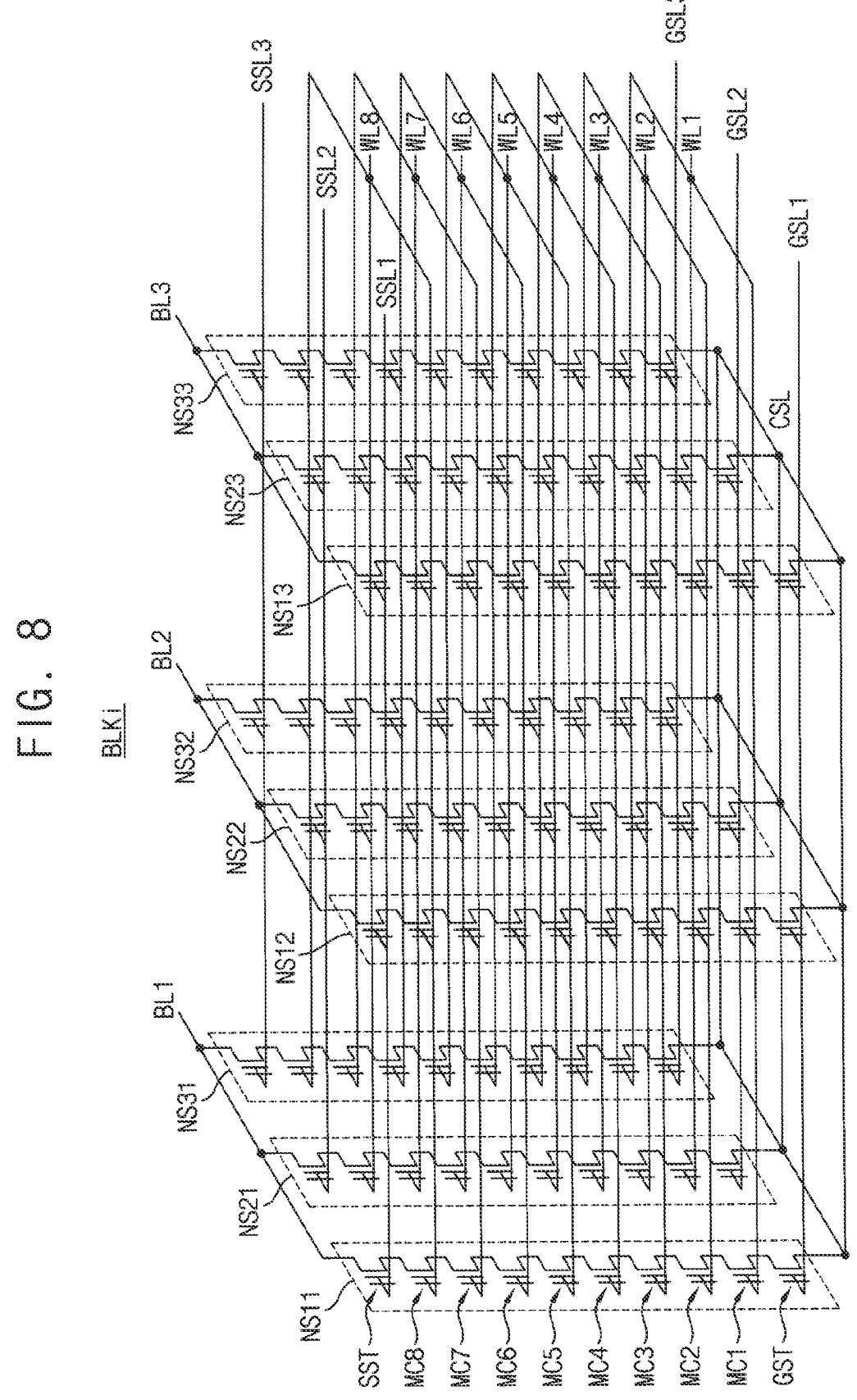
FIG. 8 is a circuit diagram illustrating an equivalent circuit of the memory block described with reference to FIG. 7, according to an example embodiment.

FIG. 8 is a circuit diagram illustrating an equivalent circuit of the memory block described with reference to FIG. 7, according to an example embodiment.

The memory block BLKi of FIG. 8 may be formed on a substrate in a three-dimensional structure (or a vertical structure). For example, a plurality of memory cell strings included in the memory block BLKi may be formed in a direction perpendicular to the substrate.

Referring to FIG. 8, the memory block BLKi may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 8, each of the memory cell strings NS11 to NS33 is illustrated to include eight memory cells MC1 to MC8. However, example embodiments are not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 6, the memory block BLKb is illustrated to be coupled to eight word-lines WL1 to WL8 and three bit-lines BL1 to BL3. However, example embodiments are not limited thereto. In some example embodiments, the memory cell array 100a may be coupled to any number of word-lines and bit-lines.

Referring back to FIG. 6, the control circuit 260 may receive a command (signal) CMD and an address (signal) ADDR from an outside, and control an erase loop, a program loop and a read operation of the nonvolatile memory device 200 based on the command signal CMD and the address signal ADDR. The program loop may include a program operation and a program verification operation. The erase loop may include an erase operation and an erase verification operation. The read operation may include a normal read operation and data recover read operation.

For example, the control circuit 260 may generate control signals CTLs, which are used for controlling the voltage generator 250, based on the command signal CMD, and generate a row address R_ADDR and a column address C_ADDR based on the address signal ADDR. The control circuit 260 may provide the row address R_ADDR to the address decoder 240 and provide the column address C_ADDR to the data input/output circuit 230.

The address decoder 240 may be coupled to the memory cell array 210 through the string selection line SSL, the plurality of word-lines WLs, and the ground selection line GSL. During the program operation or the read operation, the address decoder 240 may determine one of the plurality of word-lines WLs as a selected word-line and determine rest of the plurality of word-lines WLs except for the selected word-line as unselected word-lines based on the row address R_ADDR.

The voltage generator 250 may generate word-line voltages VWLs, which are used for the operation of the non-volatile memory device 200 using power PWR from the outside, based on the control signals CTLs from control circuit 260. The word-line voltages VWLs may be applied to the plurality of word-lines WLs through the address decoder 240.

For example, during the erase operation, the voltage generator 250 may apply an erase voltage to a well of the memory block and may apply a ground voltage to entire word-lines of the memory block. During the erase verification operation, the voltage generator 250 may apply an erase verification voltage to the entire word-lines of the memory block or sequentially apply the erase verification voltage to word-lines in a word-line basis.

For example, during the program operation, the voltage generator 250 may apply a program voltage to the selected word-line and may apply a program pass voltage to the unselected word-lines. In addition, during the program verification operation, the voltage generator 250 may apply a program verification voltage to the selected word-line and may apply a verification pass voltage to the unselected word-lines.

In addition, during the read operation, the voltage generation generator 250 may apply a read voltage to the selected word-line and may apply a read pass voltage to the unselected word-lines.

The page buffer circuit 220 may be coupled to the memory cell array 210 through the plurality of bit-lines BLs. The page buffer circuit 220 may include a plurality of page buffers. In some example embodiments, one page buffer may be connected to one bit-line. In other example embodiments, one page buffer may be connected to two or more bit-lines.

The page buffer circuit 220 may temporarily store data to be programmed in a selected page during the program operation or data read out from the selected page during the read operation. The page buffer circuit 220 may operate in response to a control signal PCTL from the control circuit 260.

The data input/output circuit 230 may be coupled to the page buffer circuit 220 through data lines DLs.

During the program operation, the data input/output circuit 230 may receive the selected weight data SWDT and the parity data PRT and provide the selected weight data SWDT and the parity data PRT to the page buffer circuit 220 based on the column address C_ADDR received from the control circuit 260.

During the read operation, the page buffer circuit 220 may receive the selected weight data SWDT and the parity data PRT stored in the memory cell array 210 and provide the selected weight data SWDT and the parity data PRT to the data input/output circuit 230.

Figure 9:
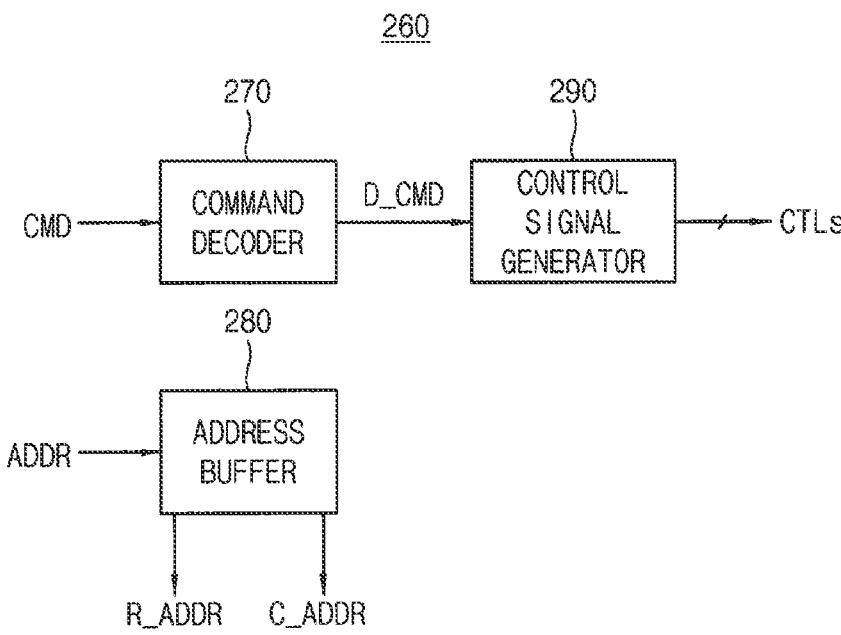
FIG. 9 is a block diagram illustrating the control circuit in the nonvolatile memory device of FIG. 6 according to an example embodiment.

FIG. 9 is a block diagram illustrating the control circuit in the nonvolatile memory device of FIG. 6 according to an example embodiment.

Referring to FIG. 9, the control circuit 260 includes a command decoder 270, an address buffer 280, and a control signal generator 290.

The command decoder 270 may decode the command CMD, and provide a decoded command D_CMD to the control signal generator 290.

The address buffer 280 may receive the address signal ADDR, provide the row address R_ADDR to the address decoder 240, and provide the column address C_ADDR to the data input/output circuit 230.

The control signal generator 290 may receive the decoded command D_CMD from the command decoder 270, generate the control signals CTLs based on an operation directed by the decoded command D_CMD, and provide the control signals CTLs to the voltage generator 250.

Figure 10:
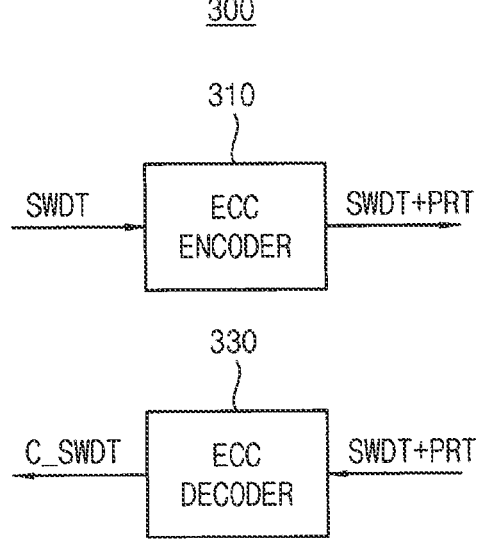
FIG. 10 is a block diagram illustrating an example of the ECC engine in FIG. 1 according to an example embodiment.

FIG. 10 is a block diagram illustrating an example of the ECC engine in FIG. 1 according to an example embodiment.

Referring to FIG. 10, the ECC engine 300 may include an ECC encoder 310 and an ECC decoder 330.

The ECC encoder 310 may receive the selected weight data SWDT from the artificial neural network engine 100, may perform an ECC encoding on the selected weight data SWDT to generate the parity data PRT, and provide the selected weight data SWDT and the parity data PRT to the nonvolatile memory device 200.

The ECC encoder 330 may receive the selected weight data SWDT and the parity data PRT from the nonvolatile memory device 200, perform an ECC decoding on the selected weight data SWDT based on the parity data PRT to correct an error in the selected weight data SWDT, and provide corrected selected weight data C_SWDT to the artificial neural network engine 100.

Figure 11:
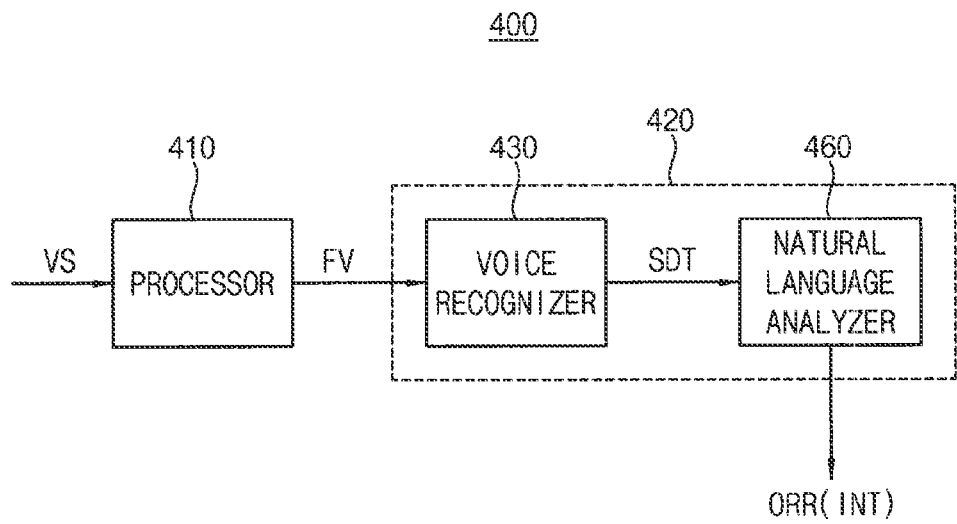
FIG. 11 is a block diagram illustrating an electronic device including an object recognition device according to an example embodiment.

FIG. 11 is a block diagram illustrating an electronic device including an object recognition device according to an example embodiment.

In FIG. 11, it is assumed that the object data constructing the object includes a voice signal VS.

Referring to FIG. 11, an electronic device 400 may include a processor 410 and an object recognition device (e.g., a voice recognition device) 420.

The processor 410 may extract a feature vector FV from the voice signal VS constructing the object. Further, the processor may provide a learning data and weights.

The object recognition device 420 may make an object recognition model learn by using the learning data and a portion of the weights, and apply the feature vector to the object recognition model to provide a recognition result of the object. The object recognition device (e.g., the voice recognition device) 420 may include a voice recognizer 430 and a natural language analyzer 460.

The voice recognizer 430 may apply the feature vector FV to the above-described learned object recognition model to generate a sentence data SDT corresponding to the voice signal VS, and may provide the sentence data SDT to the natural language analyzer 460.

The natural language analyzer 460 may receive the sentence data SDT from the voice recognizer 430. The natural language analyzer 460 may analyze the sentence data SDT to output a recognition result ORR including intent information INT of the voice signal VS. The natural language analyzer 460 may perform at least one of morphemic analysis, syntactic analysis, semantic analysis, or discourse analysis on the sentence data. Through such an analysis, the natural language analyzer 460 may determine intent information INT of the sentence data. For example, the natural language analyzer 120 may determine the intent information of the sentence data SDT and provide the recognition result ORR including the intent information INT.

Figure 12:
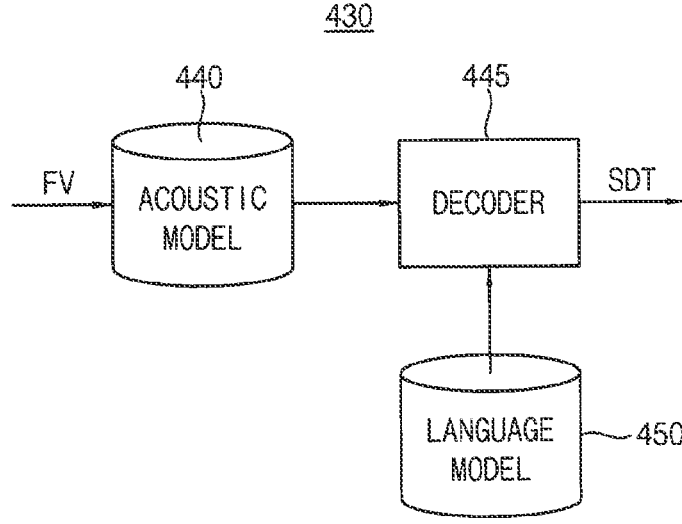
FIG. 12 is a block diagram illustrating an example of the voice recognizer in FIG. 11.

FIG. 12 is a block diagram illustrating an example of the voice recognizer 430 in FIG. 11.

Referring to FIG. 12, the voice recognizer 430 may include an acoustic model 440, a decoder 445, and a language model 450.

The acoustic model 440 recognizes phonemes from the feature vector FV. The acoustic model 440 may be, for example, a dynamic time warping (DTW)-based acoustic model or a hidden Markov modeling (HMM)-based acoustic model.

The decoder 445 may generate the sentence data SDT by recognizing words from the phonemes through the acoustic model 440. The language model 450 may be, for example, an N-gram language model and a neural network-based model. The language model 440 may be the object recognition model 105 which is capable of being trained by the artificial neural network engine 100, which is described with reference to FIGS. 1 through 5.

Figure 13:
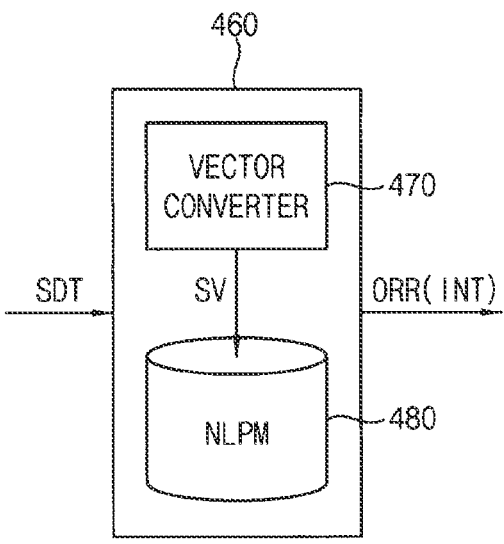
FIG. 13 is a block diagram illustrating an example of the natural language analyzer in FIG. 11.

FIG. 13 is a block diagram illustrating an example of the natural language analyzer 460 in FIG. 11.

Referring to FIG. 13, the natural language analyzer 460 may include a vector converter 470 and a natural language processing model (NLPM) 480.

The natural language analyzer 460 may receive the sentence data SDT from the voice recognizer 430. The vector converter 470 may convert words in the sentence data SDT to corresponding word vectors. When the sentence data SDT may include an unlabeled word, the vector converter 470 may process the unlabeled word to be 'unknown' and convert the unlabeled word to a constant vector. The vector converter 470 may convert characters of the sentence data SDT to corresponding character vectors. The vector converter 470 may generate a sentence vector SV of the sentence data SDT based on the word vectors and the character vectors, and provide the sentence vector to the natural language processing model 480.

The natural language processing model 480 may be a neural network-based model. The natural language processing model 480 may be the object recognition model 105, which is capable of being trained by the artificial neural network engine 100, which is described with reference to FIGS. 1 through 5. The natural language processing model 480 may perform a computation on the sentence vector SV to determine intent information INT of the sentence data SDT, and output the recognition result ORR including the intent information INT. The natural language processing model 480 may transmit the recognition result ORR to a user terminal. The recognition result ORR may be a text data corresponding to the voice signal VS.

Figure 14:
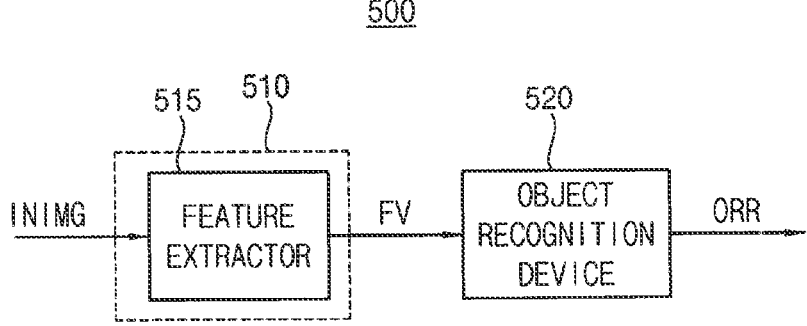
FIG. 14 is a block diagram illustrating an electronic device including an object recognition device according to an example embodiment.

FIG. 14 is a block diagram illustrating an electronic device including an object recognition device according to an example embodiment.

In FIG. 14, it is assumed that the object data constructing the object includes an input image INIMG.

Referring to FIG. 14, an electronic device 500 may include a processor 510 and an object recognition device (e.g., an image recognition device) 520.

The processor 510 may include a feature extractor 515. The feature extractor 515 may extracts a feature vector FV from the input image INIMG constructing the object, and provide the feature vector FV to the image recognition device 520.

The image recognition device 520 may apply learning data and the weights to the above-described object recognition model to make the object recognition model learn, and may apply the feature vector FV to the learned object recognition model (image recognition model) to output a recognition result ORR of the input image INIMG.

Although not illustrated, the object recognition device 520 may include an artificial neural network engine, an ECC engine, and/or a nonvolatile memory device.

The input image INIMG may be a video. The video may include a plurality of images (or frames). The processor 510, based on a common area included in each of a plurality of images (or frames) forming at least a portion of an input video, may generate one composition image by overlaying at least a portion of each of the plurality of images.

The common area may be an area including identical or substantially similar common objects (e.g., animal, plant, or people) from each of the plurality of images. In some example embodiments, the common area may be an area in which color, shadow, RGB value, or CMYK value of a plurality of images are identical or substantially similar to each other.

The processor 510 may determine a common object included in a plurality of images using a segmentation technique, select a plurality of images in designated frame intervals (e.g., 10-60 frames per second), and extract a plurality of common areas including the common object from the plurality of selected images.

Further, the processor 510 may determine a common object included in a plurality of images by using a segmentation technique, select a plurality of images of which a shape of the common object changes significantly, and extract a plurality of common areas including the common object from the plurality of selected images.

The processor 510, by using a moving object detection technique, may determine a common area, at which a size of a motion is greater than or equal to a desired (or alternatively, predetermined) vector from a plurality of images, and extract a plurality of common areas from the plurality of images with desired (or alternatively, predefined) frame intervals (e.g., 10-60 frames per second).

The processor 510, using a moving object detection technique, may determine a common area, at which a size of a motion is greater than or equal to a specific vector from a plurality of images, and extract a plurality of common areas (at which change of a motion is great) from a plurality of images.

When the plurality of common areas are extracted from the plurality images, the processor 510 may generate the composition image by overlaying the plurality of extracted common areas.

The feature extractor 515 may extract the features from the composition image to provide the feature vector FV.

Although not illustrated, the object recognition device 520 may include the artificial neural network engine 100, the ECC engine 300, and the nonvolatile memory device 200 in FIG. 1. The artificial neural network engine 100 may provide selected weights to the ECC engine 300 and store the selected weights in the nonvolatile memory device 200. Therefore, the object recognition device 520 may process AI data more efficiently.

Figure 15:
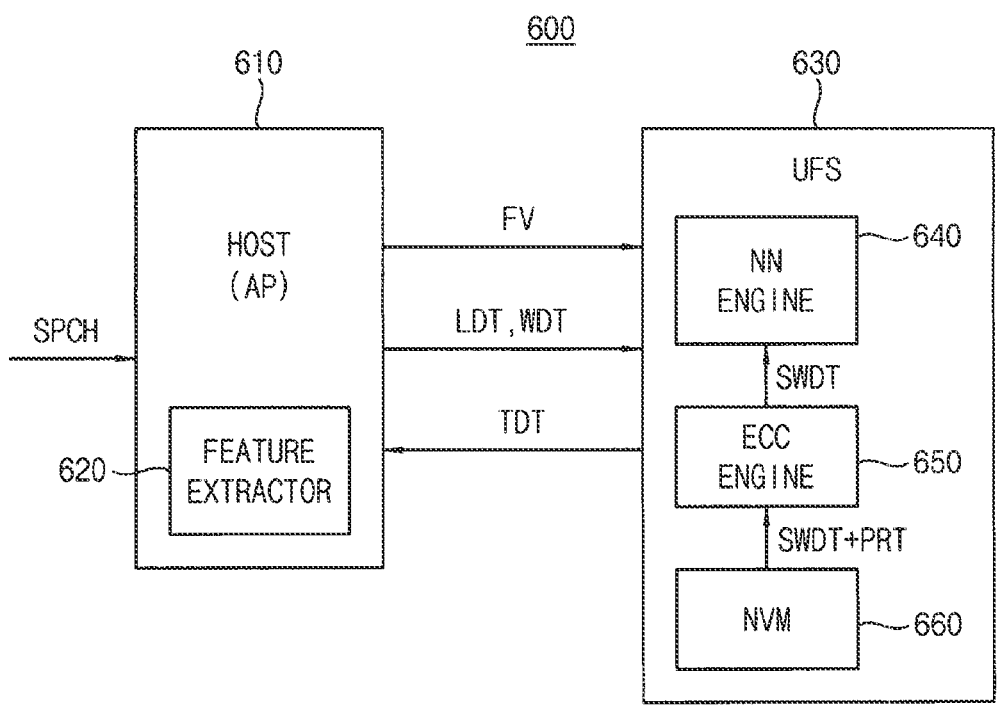
FIG. 15 is a block diagram illustrating an electronic device including an object recognition device according to an example embodiment.

FIG. 15 is a block diagram illustrating an electronic device including an object recognition device according to an example embodiment.

Referring to FIG. 15, an electronic device 600 may include a host 610 and a universal flash storage (UFS) 630.

The host (or, an application processor) 610 may include a feature extractor 620, and the UFS 630 may include an artificial neural network engine 640, an ECC engine 650, and a nonvolatile memory device 660.

The host 610 may provide a learning data LDT and weights WDT to the artificial neural network engine 630 such that the artificial neural network engine 640 makes an object recognition model implemented in the artificial neural network engine 640 learn by using the learning data LDT and the weights WDT, and the artificial neural network engine 640 may store a learned object recognition model in the nonvolatile memory device 660.

The artificial neural network engine 640 may make the object recognition model learn by using some selected weights of the weights WDT, and may provide some selected weights of the weights WDT as a selected weight data SWDT to the ECC engine 650 based on a result of learning.

The ECC engine 650 may perform an ECC encoding on the selected weight data SWDT to generate a parity data PRT, and store the selected weight data SWDT and the parity data PRT in the nonvolatile memory device 660. The ECC engine 650 may receive the selected weight data SWDT and the parity data PRT from the nonvolatile memory device 660, perform an ECC decoding on the selected weight data SWDT based on the parity data PRT to correct error in the selected weight data SWDT, and provide the corrected selected weight data SWDT to the artificial neural network engine 640.

The feature extractor 620 may extract features from a received speech data SPCH to generate a feature vector FV, and provide the feature vector FV to the artificial neural network engine 640. The artificial neural network engine 640 may apply the feature vector FV and the selected weight data SWDT to the learned object recognition model to generate a text data TDT indicating a recognition result of the speech data SPCH, and provide the text data TDT to the host 610.

The host 610 may determine a correlation between the speech data SPCH and the text data TDT, and determine an accuracy of the object recognition model implemented in the artificial neural network engine 640 based on the determined correlation.

As mentioned above, the artificial neural network engine 640 may provide the selected weights to the ECC engine 650 based on a result of learning instead of providing all of the weights WDT to the ECC engine 650, and the ECC engine 650 may perform an ECC encoding on the selected weights, which correspond to a portion of the weights WDT, and store the selected weights in the nonvolatile memory device 660. Therefore, the artificial neural network engine 640 may process the AI data such as the weights WDT more efficiently.

Figure 16:
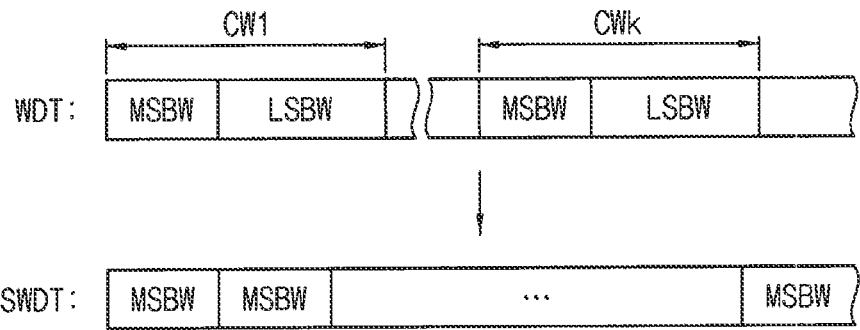
FIG. 16 illustrates the weights and the selected weights according to an example embodiment.

FIG. 16 illustrates weights and selected weights according to an example embodiment.

Referring to FIGS. 1 and 16, the weights WDT may be provided to the artificial neural network engine 100 by desired (or alternatively, predetermined) units CW1~CWk each having a desired (or alternatively, predetermined) size. Each of the desired (or alternatively, predetermined) units CW1~CWk may include upper bits of weights MSBW and lower bits of weights LSBW. For example, it may be assumed that each bit of the upper bits of weights MSBW may be equal to or greater than a second reference value, and each bit of the lower bits of weights LSBW may be smaller than the second reference value. Further, a number of the upper bits of weights WSBW may be smaller than a number of the lower bits of weights LSBW in each of the desired (or alternatively, predetermined) units CW1~'CWk.

When there is no need to maintain data integrity on all of the weights WDT, the artificial neural network engine 100 may select the upper bits of weights MSBW in each of the desired (or alternatively, predetermined) units CW1~CWk based on a result of the learning, apply the upper bits of weights MSBW and the learning data to the object recognition model, and provide the upper bits of weights MSBW as the selected weight data SWDT to the ECC engine 300 to store the selected weight data SWDT in the nonvolatile memory device 200 when a similarity between the result of learning and an expected value of the learning data is equal to or greater than the first reference value.

When the similarity between the result of learning and an expected value of the learning data is smaller than the first reference value, the artificial neural network engine 100 may increase a number of the upper bits of weights MSBW in each of the desired (or alternatively, predetermined) units CW1~CWk. The artificial neural network engine 100 may adjust a number of the upper bits of weights MSBW in each of the desired (or alternatively, predetermined) units CW1~CWk based on the similarity between the result of learning and an expected value of the learning data.

Because the ECC engine 300 may perform the ECC encoding on the selected upper bits of weights MSBW, efficiency of processing AI data may increase.

FIG. 17 is a flow chart illustrating a method of recognizing an object in an object recognition device according to an example embodiment.

Referring FIGS. 1 through 17, in a method of recognizing an object in an object recognition device 10, which includes an artificial neural network engine 100, a nonvolatile memory device 200, and an ECC engine 300 connected between the artificial neural network engine 100 and the nonvolatile memory device 200, the artificial neural network engine 100 may receive learning data LDT and weights WDT to make an object recognition model ORM learn by using the learning data LD and selected portion of the weights WDT (S710).

The artificial neural network engine 100 may store a learned object recognition model LORM in the nonvolatile memory device 200 (S720).

The artificial neural network engine 100 may provide selected weight data SWDT, corresponding to the selected portion to the ECC engine 300, and the ECC engine 300 may perform an encoding on the selected weight data SWDT to generate parity data PRT, and store the selected weight data SWDT and the parity data PRT in the nonvolatile memory device 200 (S730).

The artificial neural network engine 100 may receive a feature vector FV extracted from an object data constructing an object, apply the feature vector FV and the selected weight data SWDT to the learned object recognition model, and provide a recognition result of the object (S740).

Figure 18:
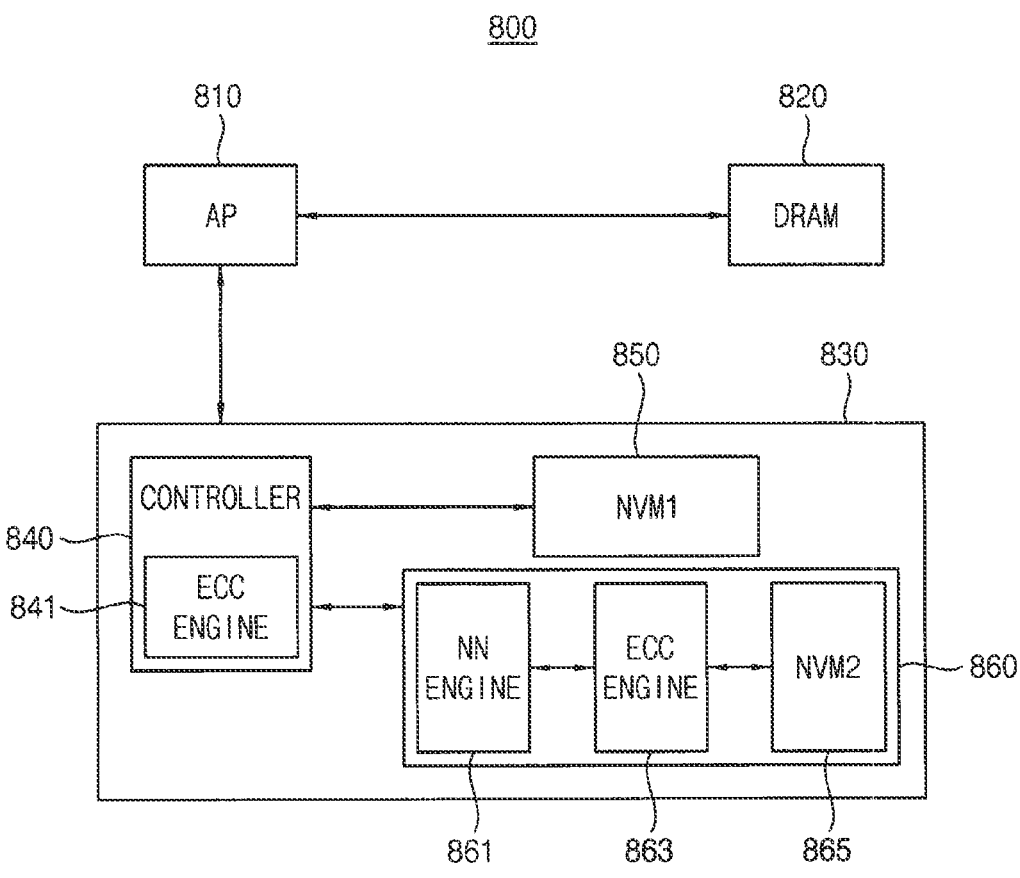
FIG. 18 is a block diagram illustrating an artificial intelligence accelerator including an object recognition device according to an example embodiment.

FIG. 18 is a block diagram illustrating an artificial intelligence (AI) accelerator including an object recognition device according to an example embodiment.

Referring to FIG. 18, an AI accelerator 800 may include an application processor 810, a volatile memory device (e.g., DRAM) 820 and a flash sub system 830.

The flash sub system 830 may include a controller 840, a first nonvolatile memory device NVM1 850 and an object recognition device 860. The object recognition device 860 may include an artificial neural network engine 861, an ECC engine 863, and a second nonvolatile memory device NVM2 865. The controller 840 may include an ECC engine 841.

The application processor 810 may control the volatile memory device 820 and the flash sub system 830. The volatile memory device 820 may include a language model.

Although not specifically illustrated in FIG. 18, the controller 840 may include a feature extractor, and the feature extractor may provide the object recognition device 860 with a feature vector extracted from an object data constructing an object.

The artificial neural network engine 861 may make the object recognition model learn by using some selected weights of the weights, and, provide some selected weights of the weights as a selected weight data to the ECC engine 863 based on a result of learning.

The ECC engine 863 may perform an ECC encoding on the selected weight data to generate a parity data and store the selected weight data and the parity data in the second nonvolatile memory device 865. The ECC engine 863 may receive the selected weight data and the parity data from the second nonvolatile memory device 865, perform an ECC decoding on the selected weight data based on the parity data to correct error in the selected weight data, and provide the corrected selected weight data to the artificial neural network engine 861.

The artificial neural network engine 861 applies the feature vector and the selected weight data to the learned object recognition model to provide a recognition result of the object to the application processor 810 via the controller 840.

Data processing speed of the second nonvolatile memory device 865 may be faster than data processing speed of the first nonvolatile memory device 850. The nonvolatile memory device 865 may have a higher performance than the first nonvolatile memory device 850.

According to some example embodiments, in an object recognition device, an ECC engine may perform an ECC encoding and an ECC decoding on selected portion of weights, instead of all of the weights, according to a result of learning. Thus, an artificial neural network engine may process the AI data more efficiently.

The disclosed example embodiments may be employed by various devices which use artificial neural network to perform data processing more efficiency.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A method of recognizing an object in an object recognition device, which includes an artificial neural network engine, a nonvolatile memory device, and an error correction code (ECC) engine connected between the artificial neural network engine and the nonvolatile memory device, the method comprising:

receiving learning data, weights and a feature vector from an outside;

making an object recognition model learn by using the learning data and a selected portion of the weights;

providing selected weight data, the selected weight data based on the selected portion of the weights;

applying the feature vector and the selected weight data to the learned object recognition model to provide a recognition result of the object;

performing an ECC encoding on the selected weight data to generate parity data;

providing the selected weight data and the parity data to the nonvolatile memory device;

providing the selected weight data to the artificial neural network engine by performing an ECC decoding on the selected weight data based on the parity data; and providing the selected weight data when a similarity between a result of applying the learning data and the selected weight data to the object recognition model and an expected value of the learning data is equal to or greater than a first reference value.

2. The method of claim 1, wherein the object recognition model includes one of a neural network model or a deep learning model that is configured to perform computing based on connection relationships among a plurality of network nodes and the selected weight data corresponding to a portion of the plurality of network nodes.

3. The method of claim 2, wherein the object recognition model includes:

an input layer configured to receive at least one of the learning data or the feature vector, the input layer including a plurality of input nodes;

an output layer configured to generate an output corresponding to the at least one of the learning data or the feature vector, the output layer including a plurality of output nodes;

a hidden layer configured to connect the input layer to the output layer, the hidden layer including a plurality of hidden nodes;

a plurality of first connection lines which connect the input nodes to the hidden nodes with first weights; and a plurality of second connection lines which connect the hidden nodes to the output nodes with second weights.

4. The method of claim 3, further comprising:

selecting, by the artificial neural network engine, some of the first weights and the second weights as selected weights in the selected weight data to make the object recognition model learn based on the selected weight data.

5. The method of claim 4, further comprising:

selecting, by the artificial neural network engine, weights that are equal to or greater than a second reference value, from among the first weights and the second weights, as the selected weights.

6. The method of claim 1, wherein the artificial neural network engine includes:

a learning module configured to make the object recognition model learn by using the learning data and the selected weight data; and a recognition module configured to apply the feature vector and the selected weight data to the learned object recognition model to provide the recognition result of the object.

7. The method of claim 6, wherein the learning module includes:

a model learning unit configured to make the object recognition model learn by using the learning data and the selected weight data;

a model storing unit configured to store the learned object recognition model; and a model evaluation unit configured to evaluate the learned object recognition model based on evaluation data.

8. The method of claim 6, wherein the recognition module includes:

an input unit configured to receive the feature vector and the selected weight data; and a recognition result provider configured to receive the feature vector and the selected weight data, and apply the feature vector and the selected weight data to the learned object recognition model to provide the recognition result of the object.

9. The method of claim 7, wherein the artificial neural network engine further includes:

a model updating module configured to determine whether to update the object recognition model and update the object recognition model based on an evaluation result of the model evaluation unit.

10. The method of claim 9, further comprising:

updating, by the model updating module, the object recognition model when a similarity between the recognition result of the object and the object is less than a second reference value.

11. The method of claim 10, further comprising:

increasing, by the learning module, a number of bits for weights in the selected weight data when the similarity between the recognition result of the object and the object is less than the second reference value.

12. The method of claim 1, wherein the nonvolatile memory device includes:

a memory cell array including a plurality of nonvolatile memory cells;

a page buffer circuit coupled to the memory cell array; and a data input/output circuit coupled to the page buffer circuit, the data input/output circuit configured to receive the selected weight data and the parity data.

13. The method of claim 1, wherein the ECC engine includes:

an ECC encoder configured to perform the ECC encoding on the selected weight data to generate the parity data; and an ECC decoder configured to perform the ECC decoding on the selected weight data provided from the nonvolatile memory device.

* * * * *